United States Patent
Sullivan

[11] Patent Number: 5,999,131
[45] Date of Patent: Dec. 7, 1999

[54] WIRELESS GEOLOCATION SYSTEM

[75] Inventor: Mark C. Sullivan, Annandale, Va.

[73] Assignee: Information Systems Laboratories, Inc., San Diego, Calif.

[21] Appl. No.: 08/886,603

[22] Filed: Jul. 1, 1997

[51] Int. Cl.⁶ .................................................. G01S 3/02
[52] U.S. Cl. ............................................................. 342/465
[58] Field of Search ..................................... 342/465, 450

[56] References Cited

U.S. PATENT DOCUMENTS

| | | | |
|---|---|---|---|
| 4,728,959 | 3/1988 | Maloney et al. | 342/457 |
| 5,327,144 | 7/1994 | Stilp et al. | |
| 5,534,876 | 7/1996 | Erickson et al. | 342/387 |
| 5,583,517 | 12/1996 | Yokev et al. | 342/457 |
| 5,596,330 | 1/1997 | Yokev et al. | 342/387 |

*Primary Examiner*—Mark Hellner
*Attorney, Agent, or Firm*—Nydegger & Associates

[57] ABSTRACT

A wireless system for locating a signal emitter includes at least three base stations for receiving the emitter signal, and a central processing site for converting information from the received signals into range estimates. Specifically, an antenna array at each base station for receives the emitter signal, and a beamformer isolates the direct path component of this received signal from interference and multi-path signals using cyclic phase minimizer techniques. In operation, an extractor is used to separate a cyclostationary feature from the direct path component of the emitter signal, and the cyclostationary feature is identified in an absolute time reference. The identified cyclostationary feature is then passed to the central processing site. At the central processing site, phase delay characteristics of the cyclostationary features from all participating base stations are compared with each other to obtain phase difference measurements. These phase difference measurements are then converted into differential range estimates for locating the emitter.

20 Claims, 3 Drawing Sheets

WIRELESS GEOLOCATION SYSTEM

FIELD OF THE INVENTION

The present invention pertains generally to wireless communications systems. More particularly, the present invention pertains to systems and methods for locating a user of a wireless communications system. The present invention is particularly, but not exclusively, useful as a passive system and method for locating a mobile user in a wireless cellular telecommunications network.

BACKGROUND OF THE INVENTION

In many situations and for many reasons it may be desirable to locate a radio transmitter using passive techniques (i.e. analyzing signals received from the unknown location) rather than active techniques (i.e. initiating signals to detect and identify the unknown location). For instance, passive techniques may be preferable if many different transmitters are located in the same general area, and a particular one of these many transmitters needs to be located. Further, passive techniques may be preferable if a transmitter, at an unknown location, is particularly difficult to detect and uniquely identify in its environment.

Locating a transmitter that is mobile and which has subsequently moved from its last known location can be particularly troublesome. Mobility, however, is an increasingly common feature of communications systems. For the case in point, consider a mobile cellular phone. With specific regard to the user of a cellular phone in a cellular telecommunications network, the ability to locate the particular cellular phone can be advantageous for several reasons. To name but a few of these advantages, information as to the exact location of a subscriber unit would be helpful for: 1) emergency 911 operators, 2) fleet tracking, 3) geoselective billing, 4) wide-area traffic monitoring, and 5) motorist assistance. In one aspect, the ability to locate a transmitting station relies on rather simple geometry.

Geometrically, several techniques can be used to find and locate an unknown point on the earth's surface. Perhaps, the simplest technique requires only range and bearing information. Thus, given that there is some known point from which measurements can be taken, it is possible to locate an unknown point if both the distance (range) and direction (bearing) from the known point to the unknown point can be determined. For another technique, if range can not be determined, bearings from two known points can be used to locate the unknown point. According to still another technique, if bearings can not be determined, the range differences from three known points, or measurements proportional to these range differences, can be used to locate the unknown point. Not surprisingly, various techniques for using electronic equipment to locate unknown points have been proposed.

One well known and widely used technique for locating the position of a mobile terminal is to have the terminal broadcast information about its location. For example, this can be done using the GPS system. This technique, although very effective and very accurate, increases the cost of the mobile terminal significantly. A second technique involves what is well known as Time Difference of Arrival (TDOA). For TDOA, the arrival time of a transmitted signal is determined at several known points. These arrival times are then used to locate the unknown point. TDOA, however, is vulnerable to errors induced by cochannel interference and multi-path propagation. Yet another technique involves determining the Angle of Arrival (AOA) of an emitter signal at several known points. Using AOA, however, additional specifically designed and calibrated antennas, with attendant increased costs, are required. In contrast with these previously used techniques, the present invention recognizes less costly systems, using uncalibrated antennas, can be used with equally effective results.

As implied above, by comparing range differences proportional measurements from a transmitter to several known points, the unknown location of the transmitter can be determined. To do this, however, it is necessary, to first determine the direct path component of the transmitted signal. This is so because it is the direct path component which has traveled the direct straight line distance from the transmitter to the receiving antenna. Consequently, cochannel interference and multi-path signals or reflections need to be eliminated or ignored. Typically, this is done by establishing a beamformer which serves to isolate the direct path component of the signal of interest.

Heretofore, several types of beamformers have been proposed. Most pertinent to the present invention are the so-called "blind" beamformers. These "blind" beamformers include systems which typically use 1) Eigenvector Techniques, 2) a Constant Modulus Algorithm, or 3) Least Squares Techniques. Such systems are currently available, and are variously applied by skilled artisans where appropriate. All of these "blind" beamformers, however, share one weakness when used to estimate propagation time. Namely, this weakness is that strong, highly correlated multi-path components will introduce a positive bias that the system is not able to correct.

In light of the above, it is an object of the present invention to provide a wireless system for determining the location of a signal emitter which is not influenced by the positive bias of strong, highly correlated multipath components. Another object of the present invention is to provide a wireless system for determining the location of a signal emitter which is able to retrieve range difference proportional measurements from the direct path component of a transmitted signal using uncalibrated antenna arrays. Still another object of the present invention is to provide a method for identifying the direct path component of an emitter signal using the phase delay characteristics of a cyclostationary feature in the signal, referred to herein as a Cyclic Phase Minimizer. Yet another object of the present invention is to provide a wireless system and method for using such a system that is relatively easy to employ, simple to use, and comparatively cost effective.

SUMMARY OF THE PREFERRED EMBODIMENTS

A system and method for finding a transmitter at an unknown location includes using at least three dispersed base station sites which are established at separate known locations. A central processing site is also included in the system and is electronically connected to each of the base station sites.

To operate the system, the transmitter must first send a signal. An antenna array at each of the base station sites then receives the signal, and a beamformer at each base station site isolates the direct path component of the received signal. In accordance with the present invention, this isolation of the direct path component is accomplished using cyclic phase minimization techniques. Information from the direct path component is then processed for subsequent use in locating the transmitter.

Signal processing at each base station site involves establishing an absolute time, identifying a cyclostationary feature of the received signal relative to a common absolute time, and separating an inherent phase delay characteristic of the signal from the direct path component. The phase delay characteristics from the direct path component with identifying information are then sent to the central processing site.

At the central processing site, the phase delay characteristics of the various signals received at the respective base station sites are compared with each other and converted into range related measurements. Specifically, these range related measurements involve differential ranges relative to the various base station sites. The exact location of the transmitter is then determined geometrically using the differential ranges.

As indicated above, cyclic phase minimization techniques are used by the beamformer of the present invention. As also indicated above, the purpose for using these techniques is to determine the direct path component of the signal that is received from a single transmitter at the various base station sites. More specifically, the cyclic phase minimization technique used here is based on the premise that all cyclostationary signals which are received at a base station site will have identifiable phase delay characteristics. Importantly, these phase delay characteristics will be related to the distance traveled by the particular signal while it is enroute from the transmitter to the base station site. It follows that the direct path component of the received signal will have the minimum phase delay characteristic when compared with the phase delay characteristics of multi-path signals which will have necessarily traveled greater distances.

To specifically identify the direct path component of the received signal, the power in the beamformer output is appropriately adjusted, and the component with minimum phase delay is identified. Since the maximum cycle feature power in the beamformer output results from the beamforming vector given by the principle eigenvector of the cyclic covariance matrix, this maximum power is used as a start point. Appropriate adjustment is to then reduce the power from the start point to a lower level. After the power has been adjusted, a search is made for the phase delay characteristics of the signal. More specifically, It is known that the reduced power constraint is satisfied by many weight vectors. In general, these weight vectors will result in a mixture of multipath components and the direct path signal component at the beamformer output. All of these components, however, have different phases. Therefore, using the fact that the minimum phase delay characteristic is to be found in the direct path component, the component having the minimum phase delay is selected and used as the direct path component. Stated differently, the power of the phase delay characteristics is lowered until relatively large changes in the power of the phase delay characteristics result in relatively small changes in the phase delay characteristic. This identifies the direct path component. The phase delay characteristics from this direct path component are then used, as discussed above, to calculate differential range estimates for locating the transmitter.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
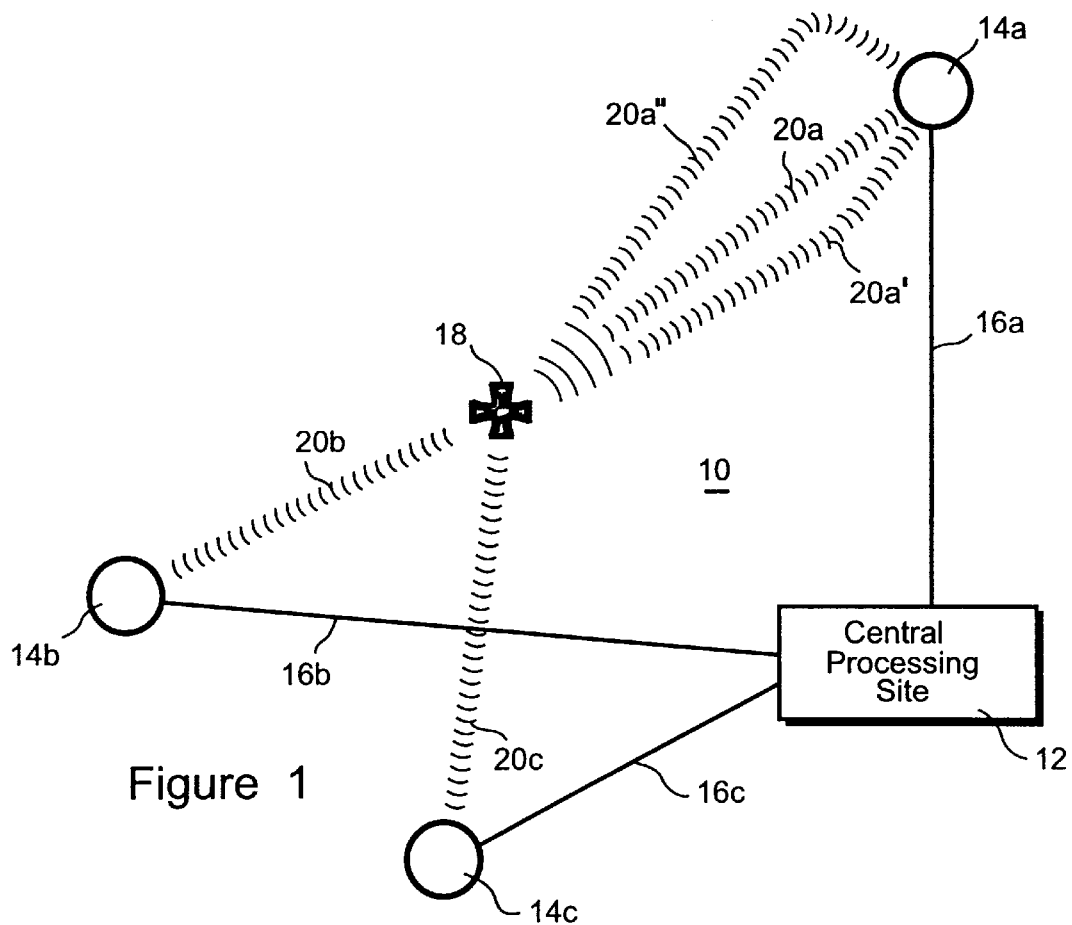
FIG. 1 is a schematic representation of site locations during operation of the system of the present invention.

Referring initially to FIG. 1, an arrangement of site locations which would be typical for the system of the present invention is shown, and the system is generally designated 10. In overview, FIG. 1 shows that the system 10 includes a central processing site 12 and at least three remote operational base station sites 14. The remote base station sites 14a, b and c which are shown in FIG. 1 are arbitrarily located and are only representative of base station sites 14 which can be used in system 10 for the present invention. Indeed, it is to be appreciated that the actual positioning of the base station sites 14 is unimportant so long as their exact location is known. Further, it is to be appreciated that more than three base station sites 14 can be, and preferably are, employed in system 10. FIG. 1 also shows that each base station site 14a–c is directly connected to the central processing site 12 by a respective communications link 16a–c. For purposes of the present invention the communications links 16 can be of any type well known in the pertinent art, such as a land line or a wireless channel.

The basic object of the system 10, of course, is to determine the exact location of a transmitter 18. Further, this is to be accomplished regardless whether the transmitter 18 be stationary or mobile. An example is the well known cellular phone. Nevertheless, although the disclosure here is focused toward the notion that transmitter 18 is a cellular phone, it is to be appreciated that the transmitter 18 can actually be any type of communications equipment which emits electromagnetic radiation signals 20 (e.g. radio frequency (RF) signals). Further, it is to be appreciated that the signals 20 can be modulated with either a digital format or an analog format.

As intended by the present invention, the signal 20 must include a cyclostationary feature which exhibits an underlying periodicity. For example, the baud rate (or a harmonic), or the carrier frequency (or a harmonic), of a signal 20 exhibits a periodicity which can be used as the cyclostationary feature. Indeed, it is known that all digital modulation formats, and many analog modulation formats, exhibit cyclostationarity. Further, for those signals 20 which have a cyclostationary feature, one or more sinusoids having characteristic frequencies of the signal 20 can be generated. Importantly, the phases of these sinusoids are proportional to a signal delay ($\tau$).

An important concept for the system 10 of the present invention is that signal phase delays $\tau$ are a function of the distance that is traveled by the signal 20. With this in mind, again consider FIG. 1. There it is generally shown that the transmitter 18 is radiating a signal 20. As is well known, this signal 20 is radiated in all directions. Also, subject to power and attenuation considerations, the signal 20 will eventually be received at all base stations 14 in the system 10. From the perspectives of each particular base station site 14, the direct path component of the signal 20 is the component of the signal 20 which travels in a straight line by the most direct path from the transmitter to the particular base station site 14. Stated differently, each base station site 14 receives its own direct path component of the signal 20. Thus, as depicted in FIG. 1, signal 20a is the direct path component of the signal 20 that is transmitted from transmitter 18 to the base station site 14a. Similarly, the signals 20b and 20c are direct path components of the signal 20 that are respectively received by base station sites 14b and 14c. Depending on differences in the respective straight line distances between the transmitter 18 and the various base station sites 14a–c, the signal phase delays $\tau_a$, $\tau_b$, and $\tau_c$ respectively associated with direct path signals 20a, 20b and 20c will be different. In theory, this is all rather straight forward. The situation, however, is complicated interference and multipath component considerations. For example, consider the components of signal 20 that are likely to be received at base station site 14a from transmitter 18.

FIG. 1 shows that, in addition to the direct path component signal 20a, it can happen that multipath signals 20a' and 20a' are also received at base station site 14a. As is well known by skilled artisans, these multipath components can be caused by such diverse conditions as reflections from structures or atmospheric disturbances. By definition, these multipath signals 20a' and 20a" will have traveled different paths toward base station site 14a, than did the direct path component 20a. Accordingly, their respective signal phase delays $\tau_{a'}$ and $\tau_{a''}$ will also be correspondingly different from $\tau_a$. As more fully disclosed below, the phase delays $\tau_a$, $\tau_b$ and $\tau_c$ of the direct path components of signal 20 are important for determining the location of transmitter 18. They contain useful information. On the other hand, signal phase delays from the multipath components, such as $\tau_{a'}$ and $\tau_{a''}$ are not needed and, indeed, should be eliminated. To do this, unique beamforming techniques are employed for system 10.

Figure 2:
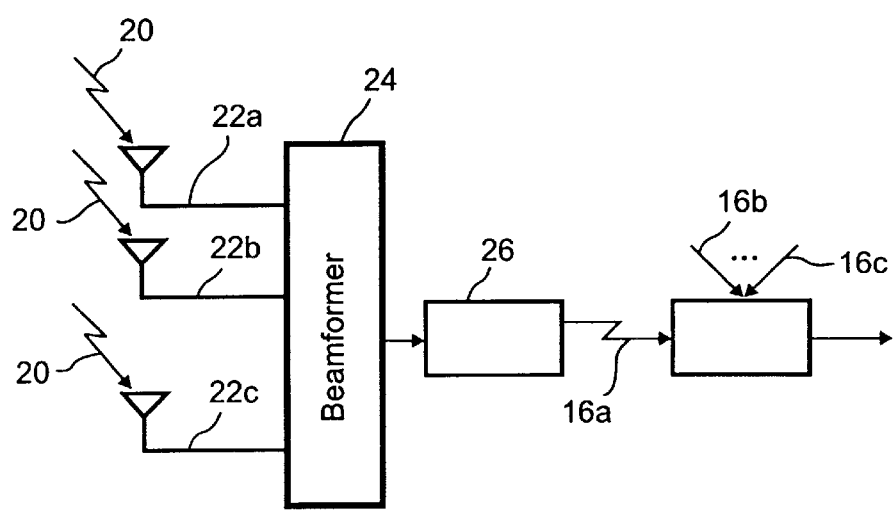
FIG. 2 is a schematic layout of the communications link and interaction of associated components between base station sites and the central processing site.

By referring to FIG. 2 it will be understood that each base station site 14 includes an antenna element 22, a beamformer 24 and an electronic extractor 26. Within this combination, the antenna element 22 collects the signal 20 that is transmitted by the transmitter 18. The beamformer 24 and extractor 26 then process the signal 20. Specifically, the beamformer 24 concentrates the signal 20 to isolate the direct path component (i.e. signal 20a) from the multipath components (i.e. signal 20a' and 20a"), and the electronic extractor 26 is then used to extract cyclostationary information from the signal 20a (e.g. signal phase delay $\tau_a$). The cyclostationary information, $\tau_a$, is then sent from the base station site 14 to the central processing unit 12 over communications link 16 for further processing. Specifically, FIG. 2 shows data communications over link 16a and indicates that similar links 16b and 16c are used for the receipt of information from base station sites 14b and 14c.

Figure 3:
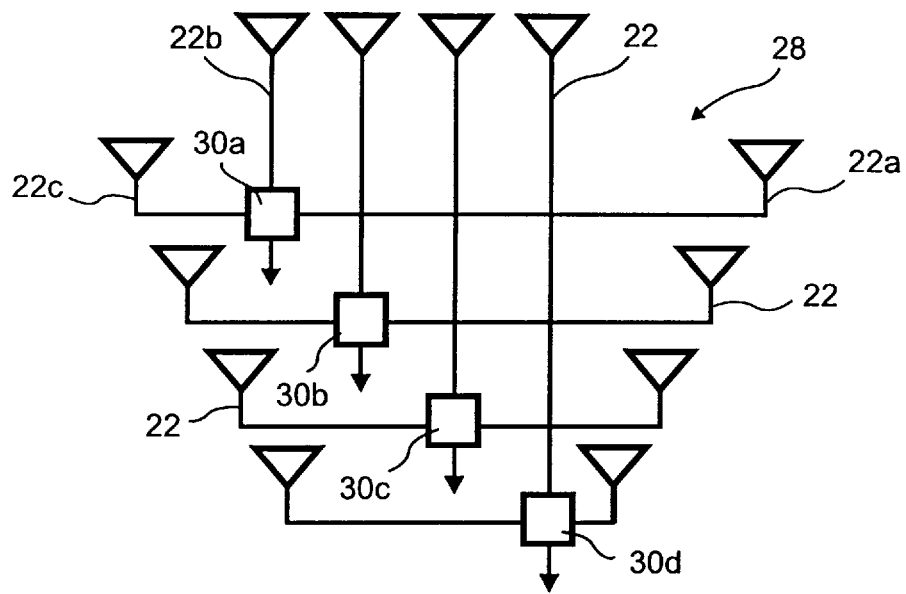
FIG. 3 is a schematic of an antenna array that is useable for the system of the present invention.

As far as antenna element 22 is concerned, it will be appreciated that a single element can be used, or an array can be used which includes several antenna elements 22. Importantly, the antenna elements 22 are uncalibrated and can have arbitrary inter-element spacing. Due to this capability, costs are reduced by allowing the reuse of antennas already in place at the base station site 14. For example, consider the sectored antenna system as shown in FIG. 3 and generally designated 28. Such antenna systems 28 typically use three sectors, with four antennas per sector. Due to the flexibility afforded system 10 by the antenna 22 the present invention, power combiners 30 can be used with an antenna system 28 to consolidate signals 20. The result is that only four, rather than twelve receive channels are established. Signal processing is thus simplified.

As indicated above, once signal 20 has been collected by an antenna array 22, the signal 20 is processed to isolate its direct path component (e.g. signal 20a). Recall that the signal 20, as it is collected by antenna 22, includes not only this direct path component signal 20a, it also includes interference and multipath components (e.g. signals 20a' and 20a"). Together, they contribute to the power in signal 20. It happens that the most cycle feature power at the output of the beamformer 24 is obtained using a weight vector given by the principle eigenvector of the cyclic covariance matrix. This includes many weight vectors, and each weight vector results from a different component of the signal 20. One of these weight vectors is due to the direct path component 20a which is to be isolated from the rest of the signal 20. For the present invention, the most power value, which includes all weight vectors, is used as start point.

Figure 4:
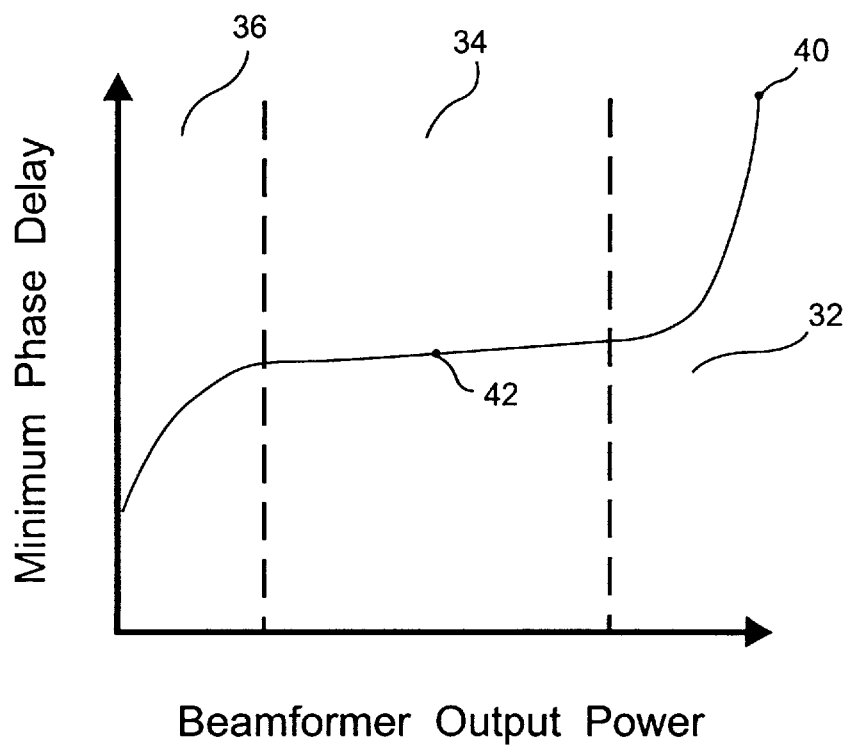
FIG. 4 is a graph showing typical variations in the minimum phase delay of a transmitter signal relative to a variation in the output power of a beamformer concentrating the signal, as used to identify the direct path component of the signal using cyclic phase minimization techniques in accordance with the present invention.

FIG. 4 displays a graph which indicates the change in the minimum phase delay ($\tau_{min}$) as a function of the output power of beamformer 24. There it will be seen that the output power can be generally divided into three regions. In the first region 32, the drop in phase delay is due to increasing attenuation of correlated multipath components at the output of beamformer 24. In the second region 34, the multipath components have been effectively removed and the beamformer 24 is varying the gain in the direction of the remaining direct path component 20a. In the third region 36, noise begins to dominate. Consequently, by following the graph 38 from a start point 40 in a direction of decreasing beamformer output power, it will be seen that there is a range, in second region 34, around point 42, where relatively large changes in the power of the phase delay characteristics result in relatively small changes in the phase delay characteristic. This being the minimum phase delay before noise dominates, this is taken to be the direct path component 20a. This operation is herein referred to as Cyclic Phase Minimization.

Figure 5:
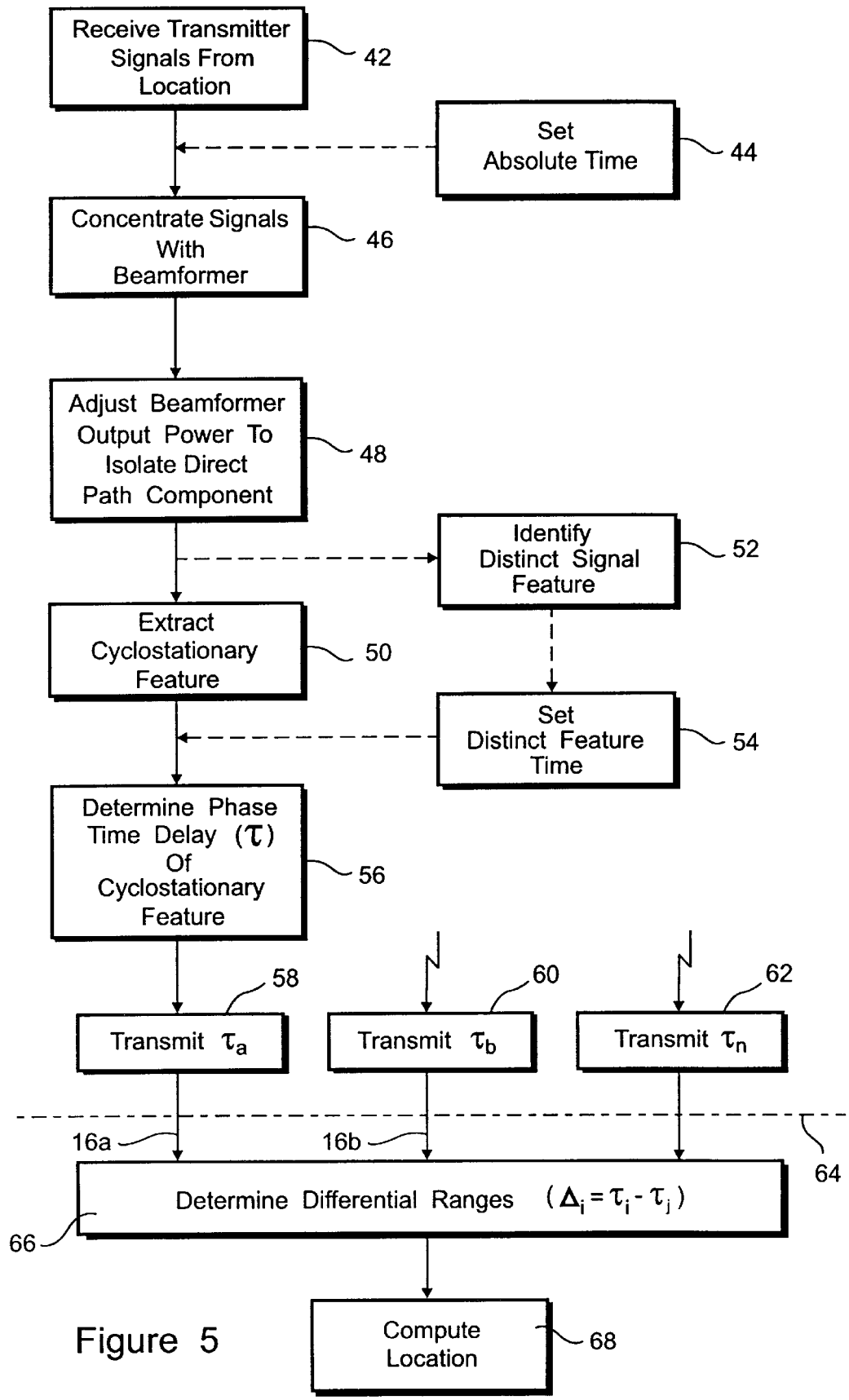
FIG. 5 is a functional block diagram setting forth the sequential steps performed during operation of the system of the present invention.

The operation of system 10 of the present invention will, perhaps, be best understood with reference to FIG. 5. Block 42 indicates that the antenna 22 at a base station site 14 receives the signal 20 from a transmitter 18. In accordance with one embodiment of the system 10, as indicated by block 44, an absolute time is established for receipt of the signal 20. The signal 20 is then processed by the beamformer 24 (see block 46), and the power output of the beamformer 24 is adjusted using Cyclic Phase Minimization techniques (see block 48) to isolate the direct path component 20a of the signal 20.

Once the direct path component signal 20a has been isolated, block 50 indicates that a cyclostationary feature is extracted from the direct path component signal 20a. As indicated above, this cyclostationary feature can come from a periodic signal characteristic, such as a baud rate of a carrier frequency. In the event an absolute time has not already been set (as indicated by block 44), in an alternative procedure, it is possible to identify a distinct signal feature of the direct path component signal 20a, such as a synchronization sequence, and identify an absolute time relative to this distinct signal feature (see blocks 52 and 54). In either case, at this point in the process, the direct path signal component 20a has been isolated, and an absolute time has been associated with the direct path signal component 20a.

As indicated above, the cyclostationary feature of a signal 20 includes a phase time delay $\tau$ which is proportional to the distance traveled by the signal 20 from the transmitter 18 to the base station site 14. Accordingly, as shown by block 56, and by way of example, the phase time delay $\tau_a$ is determined from the direct path component 20a and, as shown by block 58, is transmitted from the base station site 14a to the central processing site 12. Similar transmissions from at least two other base station sites 14 to the central processing site 12 are also made (see blocks 60 and 62). Stated differently, time-related phase delays ($\tau$) are extracted from a cyclstationary feature in the direct path component of a received signal 20 at several remote base station sites 14. This information is then sent from the various base station sites 14 to the central processing site 12 for further processing. As indicated above, the phase delays $\tau$ are distance related.

The dash-dot line 64 shown in FIG. 5 delineates functions at the various base station sites 14 from the functions performed at the central processing site 12. Specifically, the block 66 indicates that differential range estimates are calculated at the central processing site 12. Generally stated, a differential range estimate ($\Delta$) is calculated as being $\Delta_i = \tau_i - \tau_j$. In the specific case where there are only three base station sites 14, the result would be $\Delta_1 = \tau_1 - \tau_2$; $\Delta_2 = \tau_2 - \tau_3$; and 66 $_3 = \tau_3 - \tau_1$. As indicated by block 68 the various distances from each of the participating base station sites 14 to the transmitter 18 which originates the signal 20 can be calculated using the differential range estimate $\Delta_1$, $\Delta_2$, and $\Delta_3$ in well known geometrical expressions.

While the particular Wireless Geolocation System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A wireless system for determining the location of a signal emitter which comprises:

at least three mutually dispersed base station sites, each said base station site having at least one antenna for receiving said emitter signal, and each said base station site having an electronic extractor for separating a cyclostationary feature having a phase delay characteristic from said emitter signal; and a central processing site, said central processing site being connected in electronic communication with each said base station site for receiving respective said cyclostationary features therefrom, and said central processing site having a processor for converting said phase delay characteristic of said cyclostationary feature into differential range estimates for determining the location of the signal emitter.

2. A system as recited in claim 1 further comprising:

an antenna array including a plurality of antenna elements; and a beamformer connected with said plurality of antenna elements for removing cochannel interference and multi-path signals having relatively higher phase delay characteristics from a direct path component of said emitter signal having relatively minimal phase delay characteristics.

3. A system as recited in claim 2 wherein said antenna elements at said base station sites are uncalibrated and arbitrarily positioned.

4. A system as recited in claim 2 wherein said beamformer has a power output and said beamformer comprises a controller for constraining power of said cyclostationary feature at said beamformer output to separate and remove said interference and multi-path signals having relatively higher phase characteristics from said direct path component of said emitter signal having relatively minimal phase delay characteristics.

5. A system as recited in claim 2 wherein said antenna array comprises:

a plurality of antenna sector assemblies wherein each antenna sector assembly includes a plurality of antenna elements; and a plurality of power combiners, each said power combiner being connected to one said antenna element in each of said antenna sector assemblies, and each said power combiner being connected to said extractor.

6. A system as recited in claim 1 wherein said cyclostationary feature is a baud rate of said signal.

7. A system as recited in claim 1 wherein said processor compares said phase delay characteristic from one said base station with phase delay characteristics from other said base stations to obtain phase difference measurements, and further converts said phase difference measurements into said differential range estimates.

8. A system as recited in claim 1 wherein each said base station further comprises:

a timer for determining an absolute time; and a marker responsive to said timer for separating said cyclostationary feature from said emitter signal at a predetermined common absolute time.

9. A system as recited in claim 1 wherein each said base station further comprises a timer for determining an absolute time, and wherein said extractor is responsive to said timer, and said extractor identifies a distinct feature of said emitter signal and said cyclostationary feature is separated from said emitter signal at a predetermined absolute time relative to an occurrence of said distinct feature.

10. A method for locating a signal emitter which comprises the steps of:

receiving said emitter signal at three mutually dispersed base stations;

extracting a common cyclostationary feature having a phase delay characteristic from the emitter signal at each said base station;

transmitting said extracted cyclostationary features and respective said phase delay characteristics from each of said base stations to a central processing site; and converting said phase delay characteristics of said cyclostationary features into differential range estimates at said central processing site for locating the signal emitter.

11. A method as recited in claim 10 further comprising the step of removing multi-path reflections and co-channel interference from a direct path component of said emitter signal.

12. A method as recited in claim 11 wherein said removing step is accomplished by constraining the power of said cyclostationary feature at the beamformer output to separate multi-path signals having relatively high phase characteristics from said direct path component of said emitter signal having a relatively minimal phase characteristic.

13. A method as recited in claim 10 wherein said converting step comprises the steps of:

comparing said phase delay characteristics from said respective base stations to obtain phase difference measurements; and calculating said differential range estimates based on said phase difference measurements.

14. A method as recited in claim 10 further comprising the steps of:

establishing an absolute time for each said base station; and performing said extracting step at all said base stations at a common absolute time.

15. A method as recited in claim 10 further comprising the steps of:

establishing an absolute time for each said base station;

identifying a common distinct feature of said emitter signal at each of said base stations; and separating said cyclostationary feature from said emitter signal at a predetermined absolute time relative to an occurrence of said distinct feature.

16. A method for identifying the direct path component of a radiated signal for use in determining the location of the signal source which comprises the steps of:

identifying a phase delay characteristic of a cyclostationary feature of said signal;

varying the power of said phase delay characteristic;

monitoring said phase delay characteristic;

determining a power range wherein relatively large changes in power of said phase delay characteristic result in relatively small changes in said phase delay characteristic; and using said phase delay characteristic in said range for determining the location of the signal source.

17. A method as recited in claim 16 wherein said varying step is accomplished by constraining the power of said phase delay characteristic.

18. A method as recited in claim 16 wherein said method is accomplished at multiple dispersed base stations, and said method further comprises the steps of:

comparing said phase delay characteristics from said respective base stations to obtain phase difference measurements; and calculating differential range estimates based on said phase difference measurements.

19. A method as recited in claim 18 further comprising the steps of;

establishing an absolute time for each said base station; and performing said extracting step at all said base stations at a common absolute time.

20. A method as recited in claim 18 further comprising the steps of:

establishing an absolute time for each said base station;

identifying a common distinct feature of said emitter signal at each of said base stations; and separating said cyclostationary feature from said emitter signal at a predetermined absolute time relative to an occurrence of said distinct feature.

* * * * *

UNITED STATES PATENT AND TRADEMARK OFFICE
CERTIFICATE OF CORRECTION

PATENT NO.   : 5,999,131
DATED        : December 7, 1999
INVENTOR(S) : Mark C. Sullivan It is certified that error appears in the above-identified patent and that said Letters Patent is hereby corrected as shown below:

Column 5, Line 25
DELETE
[20a']
INSERT
--20a"--

Column 7, Line 24
DELETE
" [66]" and insert --Δ--.

Signed and Sealed this

Twenty-fourth Day of October, 2000

Attest:

Q. TODD DICKINSON

Attesting Officer

Director of Patents and Trademarks